(No Model.)
C. E. DAVIS.
SYSTEM AND APPARATUS FOR APPLYING BRAKES TO ELECTRIC CARS.
No. 535,679. Patented Mar. 12, 1895.
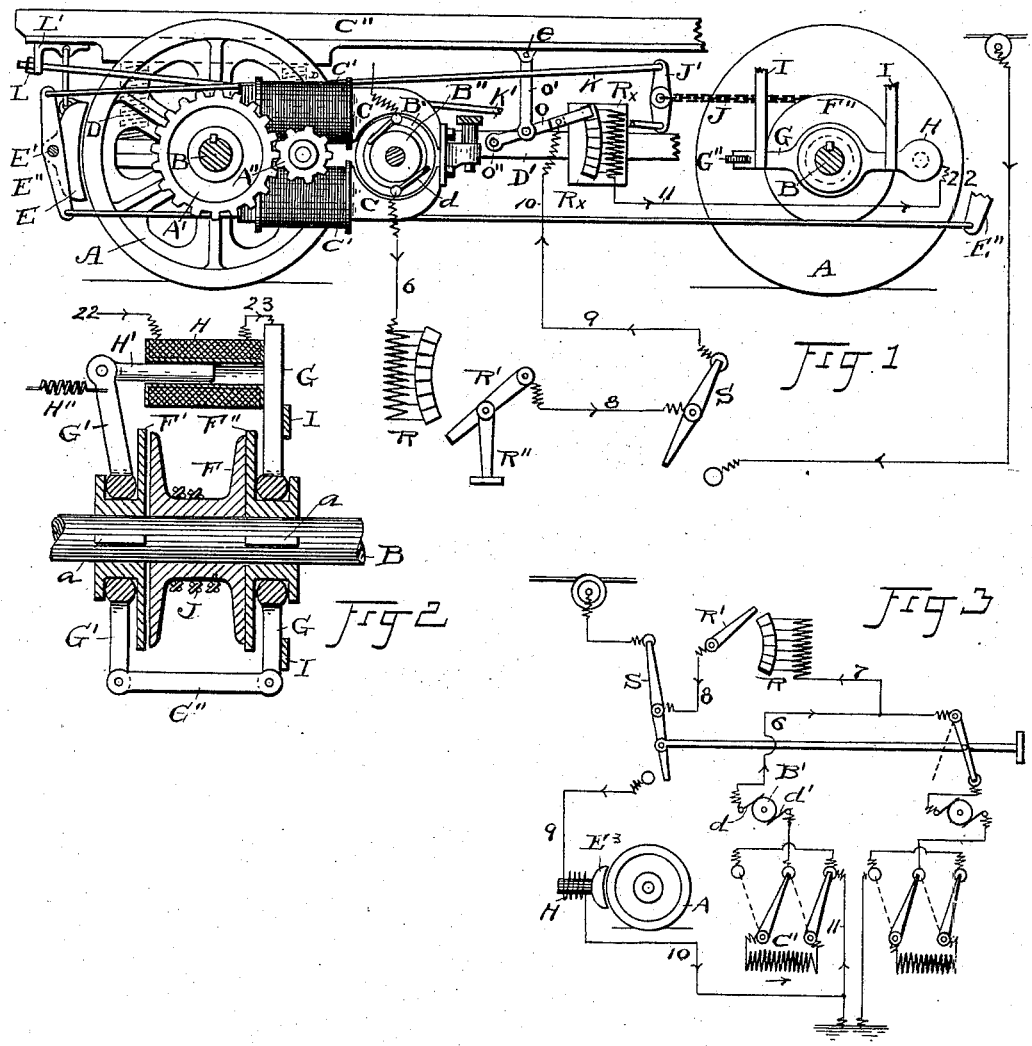
ATTEST
Walter J. Gunthorp
Jno. H. Conlee
INVENTOR
Charles E. Davis
BY Francis W. Parker,
ATTORNEY

UNITED STATES PATENT OFFICE.

CHARLES E. DAVIS, OF CHICAGO, ILLINOIS, ASSIGNOR, BY MESNE ASSIGNMENTS, TO JAMES PARMELEE, OF NEW YORK, N. Y.

SYSTEM AND APPARATUS FOR APPLYING BRAKES TO ELECTRIC CARS.

SPECIFICATION forming part of Letters Patent No. 535,679, dated March 12, 1895.

Application filed December 29, 1893. Serial No. 495,089. (No model.)

*To all whom it may concern:*

Be it known that I, CHARLES E. DAVIS, a citizen of the United States, residing at Chicago, county of Cook, and State of Illinois, have invented new and useful Improvements in Systems and Apparatus for Retarding and Applying Brakes to Electric Street-Cars or other Electrically-Driven Mechanisms, of which the following is a specification.

My invention relates to a system and apparatus for retarding and applying brakes to electric street cars or other electrically driven mechanisms, and it consists in a system of circuit relations whereby the machine normally operating the car as a motor may be transferred into a generator in accordance with my former application, Serial No. 488,282, and the current so generated may be utilized to cause the mechanical application of the brake to the wheels of the car either by magnetizing the brake shoes themselves or by mechanically pressing them against the periphery of the wheel in the ordinary manner. It also consists of means of regulating the application of such brakes both manually and automatically.

It further consists of various details of construction and of electrical connection fully pointed out in the following specification and illustrated in the drawings, in which—

Figure 1 is a diagrammatic side elevation, partially in section, of the mechanism under the car. Fig. 2 represents a detail showing brake reel. Fig. 3 represents a diagrammatic view of the circuits where one motor only is utilized for braking purposes.

Similar letters and figures of reference indicate like parts throughout the several views.

The car wheel A is mounted on the axle B upon which is mounted also the gear wheel A' communicating motion through pinion A'' to the armature B' of an electric motor and commutator B'' revolving within the field magnets C C, being energized by the coils C' C', the armature B' and the coils C' C' constituting the elements of any suitable form of electric motor.

The car body may be represented by the sill C'' which in turn is mounted upon springs, one of which is indicated at D resting upon the truck frame D'. Suitably supported from the truck or car body are the brake shoes E connected with the brake rod E' and equalizer E''.

The brake chain reel F is mounted on the axle B between two face collars or flanges F' and F'' which though operating upon the feathers *a* are free, one or both, for endwise movement through a short distance, clamping the reel F when approaching and releasing it when receding. Controlling the position of these flanges are arms G and G' preferably of iron having a forked opening in the center and coupled at one end by a pivoted link G'' and supplied at the other with a solenoid H connected to arm G, and plunger H' connected to arm G'. A retractile spring is indicated at H''. The system may be prevented from rotating by the supporting straps I I.

Co-operating with the reel F is the chain J extending to the equalizer J', one end of which is coupled to equalizer E'' by rod K and the other end of which is connected to the trailer (if one there be) by rod K' which is supplied with a stop L secured thereto co-operating with a stout support L'.

Although an important feature of my invention, it is not deemed necessary to show the connection between the brake rod K' and the trail car or cars, inasmuch as it is the same connection that is used in any mechanically operated brake, consisting of a brake chain or other connection extending to the trail car or cars and connected to the ordinary brake system upon such cars. The rod K' is shown broken off near the margin of the drawings, but may be connected to the trailer in any well known manner.

The location and circuit of the controlling contacts and rheostat R are shown in Fig. 3 in multiple series with the motors both before and after the brake switch S has been thrown, the brake mechanism or coil H, being included in circuit with only one of the motors, the other motor being open-circuited.

When the machines are operating as motors the circuit relations will be readily understood from the drawings.

In Fig. 3, and after the switch S is thrown and the other switches are operated after the well known method described in prior application above referred to the current will circulate as follows: The right hand motor being open-circuited the left hand motor will produce a current at armature brush $d$ upward on wires 6 and 7 to rheostat R, on arm R', wire 8, switch S, wire 9 to magnet H, wire 10 to ground wire 11, thence through the field as indicated by the arrow and back to armature B' by way of commutator brush $d'$, thus energizing the brake shoe $E^3$ and applying the brake in proportion to the intensity of the current in said local circuit controlled by the resistance R.

In Fig. 1 the local circuit is shown as passing an extra resistance $R^x$ upon the contacts of which is the swinging arm O bearing a link O', the arm and link being fixed respectively to the car body and the truck frame, the pivot of the former being indicated at O'', the pivot of the latter at $e$. The current generated by the motor in Fig. 1 after passing through the motor fields, switches, &c., in the usual way, passes out by brush $d$, thence by wire 6 to rheostat R, arm R' operated by the hand lever R'', wire 8 to the switch S, wire 9, flexible wire 10 to the automatically adjusted rheostat $R^x$, wire 11 to flexible wire 22, solenoid H, wire 23 to the ground connection on arm G. (See Fig. 2.) It will readily be seen from Fig. 1 that the retarding and clamping effects upon the reel F from the solenoid H are each twofold: first, that exerted by the mechanical clamping from core H', and, secondly, that obtained by the magnetic adhesion between the plates F' and F'' and the reel all being included in the magnetic circuit of the said solenoid the stationary reel retarding the mass through direct action, all of which will be readily understood. The action of the automatic rheostat $R^x$ will be readily seen from Fig. 1 in which the resistance is cut out by movement of the arm O over the contacts as the car body becomes more and more heavily loaded compressing the springs D in the usual manner. The removal of resistance $R^x$ allows more current to circulate in the local or brake circuit, thereby increasing the intensity of the application of the brake in proportion to the load; affecting in this manner both the coil H and the generator as well, both of which devices are in circuit in series with said resistance.

The use and operation of the device will be readily understood from the foregoing.

I do not care to limit myself to the details of construction shown herein as others may be employed to carry out the system of operation herein set forth.

What I claim as new, and desire to secure by Letters Patent, is—

1. In an electric brake, a retarding device, a magnetic friction surface, a source of magnetization and an iron lever arrangement between the said source and surface, whereby the said magnetization acts in a two-fold manner to arrest the motion.

2. In an electric brake, a retarding device, a magnetic friction surface, a source of magnetization consisting of a magnetic coil and a moving magnetic part and an iron lever arrangement between the said moving part and said surface, whereby the said magnetization acts in a two-fold manner on the said friction surface.

3. In a brake for revolving machinery driven by a plurality of motors, a source of electrical supply, a local circuit, means for converting one of the motors into a generator and coupling same to said local circuit, means for cutting off another motor from the said source of supply, and an operating connection between the said means.

4. In a brake for revolving machinery driven by a plurality of motors, a plurality of exterior circuits, means for detaching all the motors from one of the exterior circuits and means for coupling a part only of such motors to another of such circuits leaving a motor inoperative, in combination with an operating connection between said means.

5. In a brake for revolving machinery driven by a plurality of motors, a plurality of exterior circuits, means for detaching all the motors from one of the exterior circuits, means for reversing the relation of the elements of the motor or motors, and means for coupling a part only of such motors to another of such circuits, leaving a motor inoperative, in combination with an operating connection between the said means.

6. In a brake for revolving machinery driven by a plurality of motors, a plurality of exterior circuits, means for detaching all the motors from one of the exterior circuits, means for reversing the relation of the elements of the motor or motors, and means for coupling a part only of such motors to another of such circuits, leaving a motor inoperative, in combination with an electric translating device in one only of said exterior circuits.

7. In combination with an electric device for effecting the movement of a car, a yielding connection between the axle and the car body, an electric circuit for the device, a current controlling mechanism in series relation with said device in said circuit, and an operating connection for said controlling mechanism whereby the weight of said car body may control the action of said mechanism.

8. In an electric device for a car, a yielding connection between the axle and the car body, an electric circuit for the device, a current controlling mechanism and an electric translating device for effecting the movement of a car in series with each other in said circuit, an operating connection for said controlling mechanism whereby the weight of said car body may control the current supply to said translating device.

9. In an electric device for a car, a yielding connection between the axle and the car body, an electric circuit for the device, a controlling mechanism in said circuit, an electric generator in such circuit, an operating connection from the car body to said controlling mechanism whereby the weight of said car body may control the current-generation of the said generator.

10. In an electric device for a car, a yielding connection between the axle and the car body, an electric circuit for the device, a current controlling mechanism in series relation in said circuit, with a device for effecting the movement of the car, an operating connection for said controlling mechanism, whereby the weight of said car body may control the action of the said device effecting the movement of the car.

11. In an electric device for a car, a yielding connection between the axle and the car body, an electric circuit for the device, a current controlling mechanism in series relation in said circuit with a plurality of electrical devices for effecting the movement of the car, and an operating connection for said controlling mechanism whereby the weight of said car body may control the action of each of said plurality of devices.

12. In an electric system for a car, a yielding connection between the axle and the car body, an electric circuit, a current controlling mechanism in series relation in said circuit with an electric braking device, and an operating connection with the said controlling mechanism, whereby the weight of the car body may control the action of said mechanism.

CHARLES E. DAVIS.

Witnesses:
JAMES J. O'TOOLE,
J. E. HURTUBISE.